UNITED STATES PATENT OFFICE.

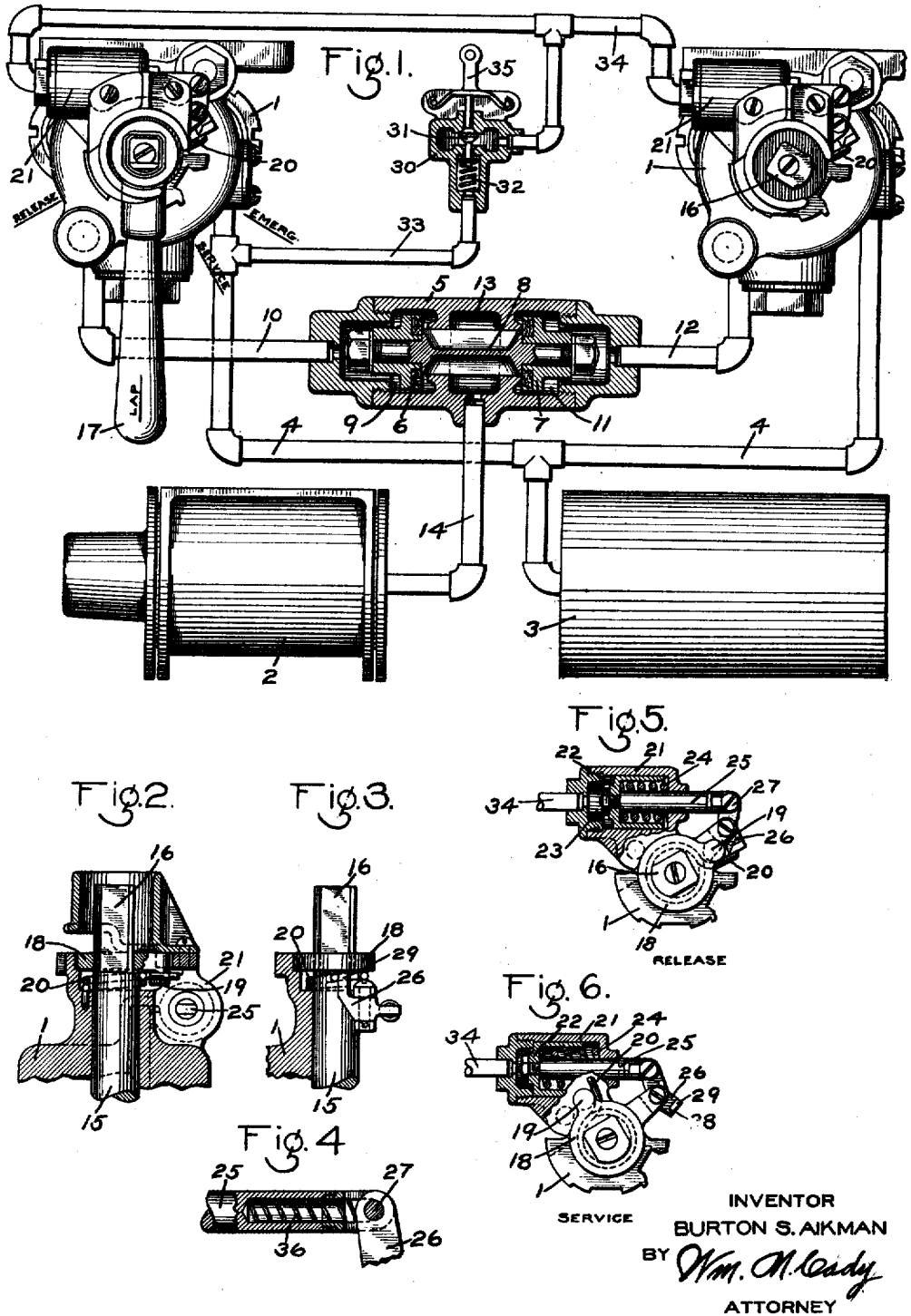

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

PROTECTIVE DEVICE FOR FLUID-PRESSURE BRAKES.

1,400,651. Specification of Letters Patent. Patented Dec. 20, 1921.

Application filed March 8, 1921. Serial No. 450,554.

*To all whom it may concern:*

Be it known that I, BURTON S. AIKMAN, a citizen of the United States, residing at Milwaukee, in the county of Milwaukee and State of Wisconsin, have invented new and useful Improvements in Protective Devices for Fluid-Pressure Brakes, of which the following is a specification.

This invention relates to fluid pressure brakes, and more particularly to a brake valve device.

The principal object of my invention is to provide a brake valve device having means for automatically effecting an application of the brakes, if the pressure in the system falls below a predetermined degree.

In the accompanying drawing, Figure 1 is a diagrammatic view of a fluid pressure brake equipment, showing my improvement applied thereto; Fig. 2 a vertical section of a portion of the brake valve device, with the spring locking latch removed; Fig. 3 a similar view, showing the spring locking latch in position; Fig. 4 a partly sectioned detail view of the connecting portions of the piston rod and the spring locking latch; Fig. 5 a plan view, partly in section, of the brake valve device, showing the parts in release position; and Fig. 6 a similar view of the brake valve device, showing the parts as thrown to service application position, when the fluid pressure in the system falls below a predetermined degree.

In Fig. 1, the improved brake valve device 1 is shown applied to a straight air brake equipment, similar to that disclosed in my prior Patent No. 1,156,871, dated October 19, 1915, and comprising a brake cylinder 2, and a main reservoir or source of fluid pressure supply 3, connected by pipe 4 to the brake valve device at each end of the car, if the equipment is a double end equipment, as shown in the drawing.

Interposed between the brake valve device at each end of the car and the brake cylinder 2 is a double check valve device comprising a casing 5, containing check valves 6 and 7 connected by a stem 8.

The chamber 9 containing check valve 6 is connected by pipe 10 to the brake valve device at one end of the car and chamber 11 containing check valve 7 is connected by pipe 12 to the other brake valve device, while chamber 13 intermediate the check valves, is connected by pipe 14 to the brake cylinder 2.

The brake valve device contains the usual valve stem 15 having a key portion 16 for receiving the operating handle 17 and applied to the portion 16 and mounted in a counterbore in the brake valve casing is a collar 18 movable with the valve stem 15 and having a downwardly projecting pin 19.

Coiled around the stem 15 is a spring 20, having one end secured to the brake valve casing and the other end bent so as to be engageable by the pin 19.

Mounted on or cast integral with the brake valve body is a piston cylinder 21, containing a piston 22 having a chamber 23 at one side connected to the main reservoir or source of fluid pressure supply 3 and subject on the opposite side to the pressure of a spring 24.

The piston stem 25 is connected to a pivotally mounted latch arm 26, the outer end of which is adapted to engage the free end of the spring 20.

In order to permit a movement of piston 22 relative to the latch arm 26, the end of the piston stem 25 is slotted for movement of the pivot pin 27 and a spring 36 tends to hold the latch arm 26 in its normal outer position.

Assuming that the brake valve at the left of Fig. 1 is the operating brake valve, the handle 17 being removable only in emergency position, it will be seen that fluid under pressure is admitted from the main reservoir 3 through ports in the brake valve at the right of the drawing to pipe 12 and chamber 11. The check valve 7 is therefore held to its seat, while the check valve 6 is maintained in its open position, so that the brake cylinder 2 is connected to the operating brake valve device at the left of the drawing, permitting the brakes to be applied and released in the usual manner.

Fluid under pressure from the main reservoir 3 is supplied to piston chamber 23 and if the pressure equals or exceeds the predetermined safe degree for which the spring 24 may be adjusted, the piston 22 will be held in the position shown in Fig. 5, in which the latch arm 26 engages the free end of spring 20.

Under the above conditions, the brake valve handle 17 may be freely manipulated in the usual manner without any action of the spring 20.

If the main reservoir pressure should fall below the predetermined degree, the piston 22 will shift the latch arm 26 out of engagement with the spring 20. Said spring being under tension in this position, the free end of the spring will engage the pin 19 on the collar 18 and shift the valve stem 15 to service application position, as shown in Fig. 6 of the drawing, so that fluid is supplied through the brake valve device to the brake cylinder 2, to effect an application of the brakes.

The operator, however, can still control the brakes and can release same, if desired, by moving the brake valve handle against the resistance of the spring.

He must hold the handle, however, since if the handle is released, it will be again moved to application position.

When the pressure in the main reservoir has been increased to the predetermined degree, the piston 22 will move the latch arm 26 to its locking position, and if the operator then moves the brake valve handle to release position, the free end of the spring will be brought to the position shown in Fig. 5.

As the free end of the spring 20 moves past the latch arm 26, the arm 26 is pushed outwardly, by the engagement of the end of the spring with a beveled face 28 of the projecting portion 29 of the latch arm, this movement being permitted by the movement of the pivot pin 27 in the slot in piston stem 25.

As the operator must hold the brake valve handle in release position to prevent an application of the brakes, this is a constant reminder that the pressure in the main reservoir is too low.

With a double end equipment, as shown in the drawing, since the non-operating brake valve is in emergency position, in which fluid under pressure is supplied to the pipe 12, if this brake valve should be operated, through the reduction in main reservoir pressure, no harm would result, as the parts would merely be moved to service application position.

It is sometimes desirable for the conductor to be able to apply the brakes and for this purpose, a valve device may be provided comprising a casing 30, containing a double beat valve 31 normally held seated in one direction by a spring 32, so as to establish communication from the main reservoir pipe 4 through pipe 33 to pipe 34 which leads to the piston chamber 23 of the brake valve device at opposite ends of the car. Fluid at main reservoir pressure is thus normally maintained on the piston 22.

If the conductor desires to apply the brakes, he pulls a cord attached to the rocking arm 35, causing the double beat valve 31 to be depressed so as to cut off communication from the main reservoir pipe 4 to the pipe 34 and vent fluid from the pipe 34.

The piston 22 will then be operated by the spring 24 so as to release the latch 26 and cause the spring 20 to shift the brake valve handle to brake application position.

Having now described my invention, what I claim as new and desire to secure by Letters Patent, is:

1. In a fluid pressure brake, the combination with a source of fluid under pressure and a brake valve device, of means operating upon a predetermined reduction in the pressure of said source of pressure for operating said brake valve device to effect an application of the brakes.

2. In a fluid pressure brake, the combination with a main reservoir, a brake cylinder, and a brake valve device having an application position in which fluid under pressure is supplied from the main reservoir to the brake cylinder, of means operating upon a predetermined reduction in main reservoir pressure for moving the brake valve device to application position.

3. In a fluid pressure brake, the combination with a source of fluid under pressure and a brake valve device for applying and releasing the brakes, of a spring tending to move the brake valve device to a position for effecting an application of the brakes, and means subject to the pressure in said source of pressure for preventing the spring from acting on the brake valve device when the pressure of the source exceeds a predetermined degree.

4. In a fluid pressure brake, the combination with a source of fluid under pressure and a brake valve device for applying and releasing the brakes, of a spring adapted to move the brake valve device to brake application position, a locking latch for engaging the spring to prevent the same from acting on the brake valve device, and means operated upon a predetermined reduction in pressure of said source for operating said latch to release the spring.

5. In a fluid pressure brake, the combination with a brake valve device for applying and releasing the brakes, of a spring tending to shift the brake valve device to brake application position, a latch for normally engaging the spring to prevent same from acting on the brake valve device, a piston subject to fluid under pressure for actuating said latch, and manually operated means for venting fluid from said piston.

6. In a fluid pressure brake, the combination with a brake valve device for applying and releasing the brakes, of a spring tending to shift the brake valve device to brake application position, a latch for normally engaging the spring to prevent same from acting on the brake valve device, a piston normally subject to fluid under pressure and operated upon a predetermined reduction in fluid pressure for actuating said latch, and a manually operated valve for venting fluid from said piston for also operating same.

7. In a fluid pressure brake, the combination with a source of fluid under pressure and a brake valve device for applying and releasing the brakes, of a spring tending to shift the brake valve device to brake application position, a latch normally engaging the spring to prevent same from acting on the brake valve device, a piston operated upon a predetermined reduction in pressure of said source of pressure for releasing said latch, and a manually operated valve for venting fluid from said piston.

8. In a fluid pressure brake, the combination with a source of fluid under pressure and a brake valve device for applying and releasing the brakes, of a spring tending to shift the brake valve device to brake application position, a latch normally engaging the spring to prevent same from acting on the brake valve device, a piston operated upon a predetermined reduction in pressure of said source of pressure for releasing said latch, and a manually operated double beat valve having one position for supplying fluid to said piston and another position for venting fluid from said piston.

9. In a fluid pressure brake, the combination with a source of fluid under pressure and a brake valve device for applying and releasing the brakes, of a piston subject to the pressure of fluid from said source of pressure, a latch operated by said piston, and a spring normally held under tension by said latch and adapted to shift the brake valve device to a brake application position upon release of the latch.

In testimony whereof I have hereunto set my hand.

BURTON S. AIKMAN.